United States Patent
Büschenfeld et al.

(10) Patent No.: US 10,053,090 B2
(45) Date of Patent: Aug. 21, 2018

(54) METHOD FOR PROVIDING USER-DEFINED CUSTOMIZATION OF A VEHICLE

(71) Applicant: VOLKSWAGEN AG, Wolfsburg (DE)

(72) Inventors: Torsten Büschenfeld, Uetze (DE);
Stephan Max, Gifhorn (DE);
Alexander Urban, Gifhorn (DE);
Stefan Brosig, Hankensbüttel (DE);
Reiner Katzwinkel, Meine (DE)

(73) Assignee: Volkswagen AG (DE)

( * ) Notice: Subject to any disclaimer, the term of this patent is extended or adjusted under 35 U.S.C. 154(b) by 37 days.

(21) Appl. No.: 15/158,624

(22) Filed: May 19, 2016

(65) Prior Publication Data
US 2016/0362103 A1 Dec. 15, 2016

(30) Foreign Application Priority Data

May 20, 2015 (DE) ........................ 10 2015 209 190

(51) Int. Cl.
*B60W 30/00* (2006.01)
*B60W 30/06* (2006.01)
(Continued)

(52) U.S. Cl.
CPC ........... *B60W 30/06* (2013.01); *B62D 15/027* (2013.01); *B62D 15/028* (2013.01); *B62D 15/0285* (2013.01); *G01C 21/165* (2013.01); *G01C 22/00* (2013.01); *G05D 1/0088* (2013.01); *G05D 1/0212* (2013.01); *G08G 1/005* (2013.01); *G08G 1/205* (2013.01); *B60W 2520/06* (2013.01);
(Continued)

(58) Field of Classification Search
CPC combination set(s) only.
See application file for complete search history.

(56) References Cited

U.S. PATENT DOCUMENTS 4,361,202 A * 11/1982 Minovitch ......... B60K 31/0008
    104/88.02
8,602,709 B2 * 12/2013 Habegger ................. E04H 6/20
    414/238
(Continued)

FOREIGN PATENT DOCUMENTS

CN    101132964 A    2/2008
DE    10331948 A1    2/2005
(Continued)

OTHER PUBLICATIONS

Office Action for German Patent Application No. 10 2015 209 190.2; dated Apr. 21, 2016.
(Continued)

*Primary Examiner* — Jonathan L Sample
(74) *Attorney, Agent, or Firm* — Barnes & Thornburg LLP

(57) ABSTRACT

A method for the user-defined provision of a vehicle in which a parking position in a parking region is identified and driven to automatically by the vehicle or with guidance by a user and, at the request of the user, the vehicle drives automatically to a transfer location in the parking region for further use. A trajectory which is traveled along as far as the parking position within the parking region is sorted and the transfer location can be defined at any desired point on this trajectory. Also disclosed is a system for carrying out the method and a motor vehicle having the disclosed system.

15 Claims, 2 Drawing Sheets

(51) Int. Cl.
*B62D 15/02* (2006.01)
*G01C 21/16* (2006.01)
*G05D 1/00* (2006.01)
*G05D 1/02* (2006.01)
*G08G 1/005* (2006.01)
*G08G 1/00* (2006.01)
*G01C 22/00* (2006.01)
*G08G 1/14* (2006.01)

(52) U.S. Cl.
CPC ..... *B60W 2520/10* (2013.01); *B60W 2900/00* (2013.01); *G08G 1/146* (2013.01)

(56) References Cited

U.S. PATENT DOCUMENTS

| | | | | |
|---|---|---|---|---|
| 9,558,664 B1* | 1/2017 | Gaebler | | G01C 21/3492 |
| 9,581,997 B1* | 2/2017 | Penilla | | G05D 1/0011 |
| 9,697,733 B1* | 7/2017 | Penilla | | G08G 1/163 |
| 9,789,816 B2* | 10/2017 | Heger | | B60Q 9/005 |
| 2005/0049766 A1* | 3/2005 | Tanaka | | B62D 15/0285 |
| | | | | 701/36 |
| 2005/0055139 A1* | 3/2005 | Tanaka | | B62D 15/028 |
| | | | | 701/1 |
| 2005/0095092 A1* | 5/2005 | Segal | | E04H 6/245 |
| | | | | 414/263 |
| 2005/0285758 A1* | 12/2005 | Matsukawa | | B60W 10/06 |
| | | | | 340/932.2 |
| 2006/0111835 A1* | 5/2006 | Baker | | G01C 21/26 |
| | | | | 701/408 |
| 2008/0288104 A1* | 11/2008 | Shani | | E04H 6/422 |
| | | | | 700/214 |
| 2010/0299016 A1* | 11/2010 | Benzler | | G05D 1/0246 |
| | | | | 701/26 |
| 2012/0022716 A1* | 1/2012 | Kitahama | | G01C 21/34 |
| | | | | 701/1 |
| 2013/0046431 A1* | 2/2013 | Becker | | B62D 15/028 |
| | | | | 701/25 |
| 2013/0173159 A1* | 7/2013 | Trum | | G01C 21/3626 |
| | | | | 701/533 |
| 2013/0231824 A1* | 9/2013 | Wilson | | G05D 1/0246 |
| | | | | 701/26 |
| 2013/0335553 A1* | 12/2013 | Heger | | B62D 15/0285 |
| | | | | 348/118 |
| 2014/0236686 A1* | 8/2014 | Grush | | G07B 15/02 |
| | | | | 705/13 |
| 2014/0309834 A1* | 10/2014 | Choi | | B62D 15/0285 |
| | | | | 701/23 |
| 2014/0316632 A1* | 10/2014 | Shaffer | | G05D 1/0088 |
| | | | | 701/23 |
| 2015/0120183 A1* | 4/2015 | Annapureddy | | G01C 21/3688 |
| | | | | 701/430 |
| 2015/0203111 A1* | 7/2015 | Bonnet | | B62D 15/027 |
| | | | | 701/25 |
| 2015/0286219 A1* | 10/2015 | Reichel | | G08G 1/0965 |
| | | | | 701/23 |
| 2015/0353080 A1* | 12/2015 | Mukaiyama | | E05B 77/54 |
| | | | | 701/23 |
| 2017/0212511 A1* | 7/2017 | Paiva Ferreira | | G06Q 10/08 |
| 2018/0046198 A1* | 2/2018 | Nordbruch | | G05D 1/0276 |

FOREIGN PATENT DOCUMENTS

| | | |
|---|---|---|
| DE | 102013215960 A1 | 3/2015 |
| DE | 102013222071 A1 | 4/2015 |
| EP | 2008915 A2 | 12/2008 |
| WO | 2006092370 A1 | 9/2006 |

OTHER PUBLICATIONS

Search Report for European Patent Application No. 16166832.2; dated Oct. 18, 2016.

* cited by examiner

METHOD FOR PROVIDING USER-DEFINED CUSTOMIZATION OF A VEHICLE

PRIORITY CLAIM

This patent application claims priority to German Patent Application No. 10 2015 209 190.2, filed 20 May 2015, the disclosure of which is incorporated herein by reference in its entirety.

SUMMARY

Illustrative embodiments relate to a method for the user-defined provision of a vehicle.

BACKGROUND

Autonomously driving vehicles are a long-term trend in the area of mobility. Vehicles which no longer rely on control by a human being permit not only the safety and efficiency of traffic systems to be increased but also their flexibility. This occurs, for example, in motor vehicles in that a user of the motor vehicle leaves it at any desired location, the motor vehicle automatically drives to a parking position, and the user requests the motor vehicle for further use from another location. A particular meaning is assigned here to the determination of the relative position of the motor vehicle and of the user. There are two basic approaches to this in the prior art.

One possibility is to measure the absolute position of the motor vehicle and of the user. The user can also transmit his position to the motor vehicle, for example, via a radio link. However, a determination of the location of the user by the motor vehicle, or vice versa, is made difficult by restricted data transmission paths, for example, owing to parking areas which are built over or interfering contours of buildings. Determining the location of the user by means of the motor vehicle proves particularly difficult. Available methods such as GPS, radio transmission or optical measuring methods quickly reach the limits of their accuracy. Identification of the user proves problematic, in particular when there is no line-of-sight link between the user and the motor vehicle.

In addition, one possibility comprises defining in advance a transfer zone for the motor vehicle for further use. The user can then request the transfer of the vehicle into the transfer zone. However, the flexibility is limited in terms of the location for the further use. Potential unavailability of the agreed transfer zone, for example, as a result of occupation, also proves problematic.

Disclosed embodiments provide a method for the user-defined provision of a vehicle which does not require absolute measurement of the location of the motor vehicle or of the user.

Disclosed embodiments relate to a method for the user-defined provision of a vehicle in which a parking position in a parking region is identified and driven to automatically by the vehicle or with guidance by a user, and at the request of the user the vehicle drives automatically to a transfer location in the parking region for further use. There is provision that a trajectory which is travelled along as far as the parking position within the parking region is stored, and the transfer location can be defined at any desired point on this trajectory.

This provides that an absolute measurement of the position of the vehicle within the parking region is no longer necessary, and an absolute measurement of the position of the user can be completely dispensed with. Since the parking region is known and the trajectory of the vehicle is known, the location of the vehicle within the parking region can be reconstructed. The vehicle can then be sent to a defined point within the parking region, which point has already been driven to at least once. Knowledge of the location of the user is therefore no longer necessary.

A trajectory includes position data and time data which are linked to one another. The position data describe a path in their sequence. Representation of the path is sufficient to define a transfer location for the vehicle. The position data on which the path is based are not measured. They are reconstructed, for example, from vehicle data such as an angular position of the wheels with respect to time. Therefore, all the features of a trajectory with respect to the storage are present. In the context of the disclosed embodiments, the term trajectory is used even if in some cases only the path is of direct significance for the method. Basically all known parking regions such as, for example, public areas of roads, parking facilities or private plots of land and buildings are considered as parking regions.

BRIEF DESCRIPTION OF THE DRAWINGS

Disclosed embodiments will be explained below on the basis of the associated drawings. In the drawings.

DETAILED DESCRIPTION OF THE DISCLOSED EMBODIMENTS

Figure 1A:
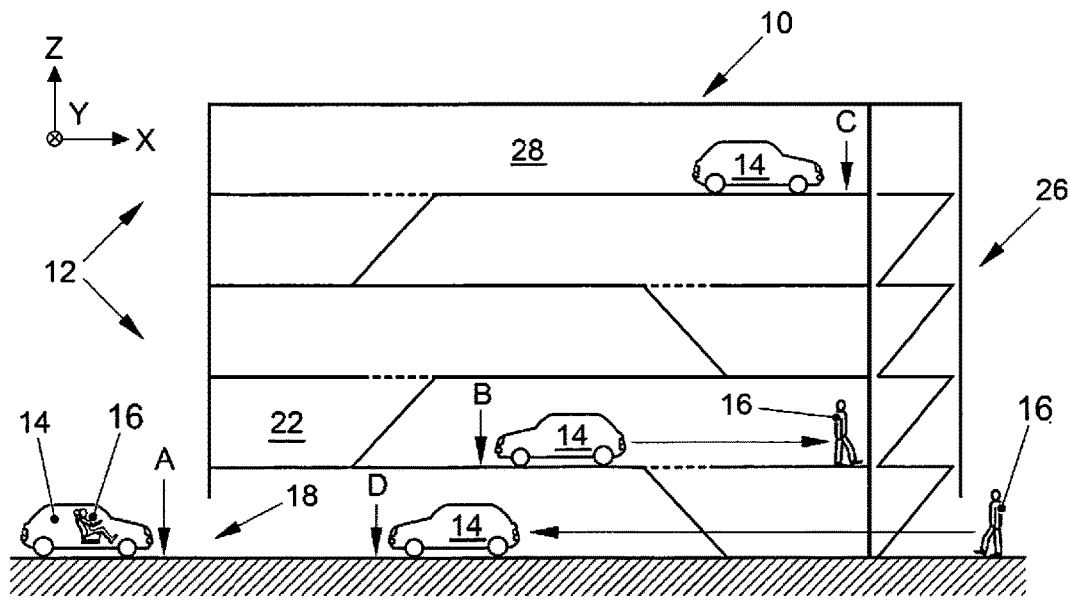
FIG. 1A shows a schematic illustration of the disclosed method for the user-defined provision of a vehicle in a first disclosed embodiment.

In at least one disclosed embodiment there is provision that means of the vehicle for measuring a horizontal and vertical direction of travel, a velocity and a time as well as a data storage device and processing device of the vehicle are used for the storage of the trajectory. The storage of the trajectory takes place particularly easily and all the required data for a complete trajectory are acquired easily. It is possible, for example, to measure a steering wheel position, a wheel rotational angle position, the time, a horizontal inclination of the vehicle and an orientation of the vehicle in a horizontal plane. The rotational speed of the wheels or the velocity of the vehicle can be determined from the rotational angle position and the time. For example, a dynamic velocity vector can be determined from the steering wheel position and the velocity. By evaluating the dynamic velocity vector over time, the trajectory which is travelled along can be represented. A starting point for the measurement of time can be defined here, for example, by the first entry into the parking region. An end point for the measurement of time can be defined, for example, by the reaching of the parking position. An evaluation of the orientation in a horizontal plane can be used, for example, to correct slip effects at the wheels. Therefore, errors owing to a deviation of the rotational speed of the wheels and the vehicle velocity vector are avoided. The orientation in the horizontal plane can be measured, for example, with a compass. An evaluation of the horizontal inclination can be used, for example, to correct the trajectory in the case of uneven underlying surfaces or multi-story parking facilities. Possible errors owing to a purely two-dimensional vehicle velocity vector can be avoided. For example, a further dimension can be added to the vehicle velocity vector, and a three-dimensional trajectory can be stored.

In a further disclosed embodiment, there is provision that a position of an exit point of the user on the trajectory is stored. This provides that a defined reference point is present which is known to the user in all cases.

In a further disclosed embodiment, there is provision that the vehicle communicates via a communication device with a mobile communication device of the user, and in doing so transmits at least the trajectory at least once. This provides that after the user leaves the vehicle the complete trajectory is available to the user to order the vehicle. Therefore, the location of the vehicle can be described with respect to the exit point of the user in a way which is understandable to the user without a measurement.

In a further disclosed embodiment, there is provision that the user transmits via the mobile communication device a request for further use to the vehicle, and as a result activates the vehicle. The vehicle can be deactivated in the intermediate time or can remain in an energy-saving mode. Furthermore, the user can transmit the request to the vehicle in a way which is flexible in terms of time and location.

In a further disclosed embodiment, there is provision that the user transmits the transfer location for the vehicle via the mobile communication device, or steers the vehicle manually forwards or rearwards on the trajectory. This provides that the transfer location can be determined very flexibly and can also be changed subsequently.

In a further disclosed embodiment, there is provision that the trajectory is illustrated on the mobile communication device with surroundings information superimposed thereon. This allows the user to define the transfer location in the context of a surrounding area, or knows the location of the vehicle in this context. For example, map material which is available electronically or online can be used. For example, an orientation of the trajectory with respect to the map material can be implemented on the basis of two points. Optionally, the entry point into the parking region and the exit point of the user are considered for this. This method is simple if both points can be acquired, for example, by means of a navigation system. An orientation can also be implemented, for example, on the basis of a point and an even number with respect to the orientation of the vehicle in the horizontal plane. This is beneficial if, for example, a GPS determination of just one point is possible and unavailability for the second point can be compensated by data of the compass.

In a further disclosed embodiment, there is provision that at least the trajectory is transmitted to a further user, and the further user defines the transfer location. This allows the flexibility of the method to be increased. For example, the further use of the vehicle can be implemented by a different user than by the user who has shut down the vehicle for parking. For example, car sharing models can be implemented in this way. The trajectory can be stored purely by way of example on a server and can be retrieved by the user who would like to make further use of the vehicle.

A further disclosed embodiment relates to a system for a vehicle, which has means for communicating with vehicle-external apparatuses, actuators for automatically activating actuator elements of the vehicle, a sensor system for acquiring surroundings information and vehicle information, an open-loop and closed-loop control system for storing and processing communication information, vehicle information and surroundings information and for generating actuation signals for the actuators. According to at least one disclosed embodiment, the system is configured to carry out the disclosed method for the user-defined provision of a vehicle.

This allows for system elements to be used which are already known in modern vehicles. The system can be configured for the disclosed method by implementing method-specific software in, for example, the control system.

A further disclosed embodiment relates to a motor vehicle which has the disclosed system for carrying out the disclosed method. This allows the motor vehicle to become more flexible.

The various embodiments which are disclosed in this application can be combined with one another unless stated otherwise in an individual case.

Figure 1B:
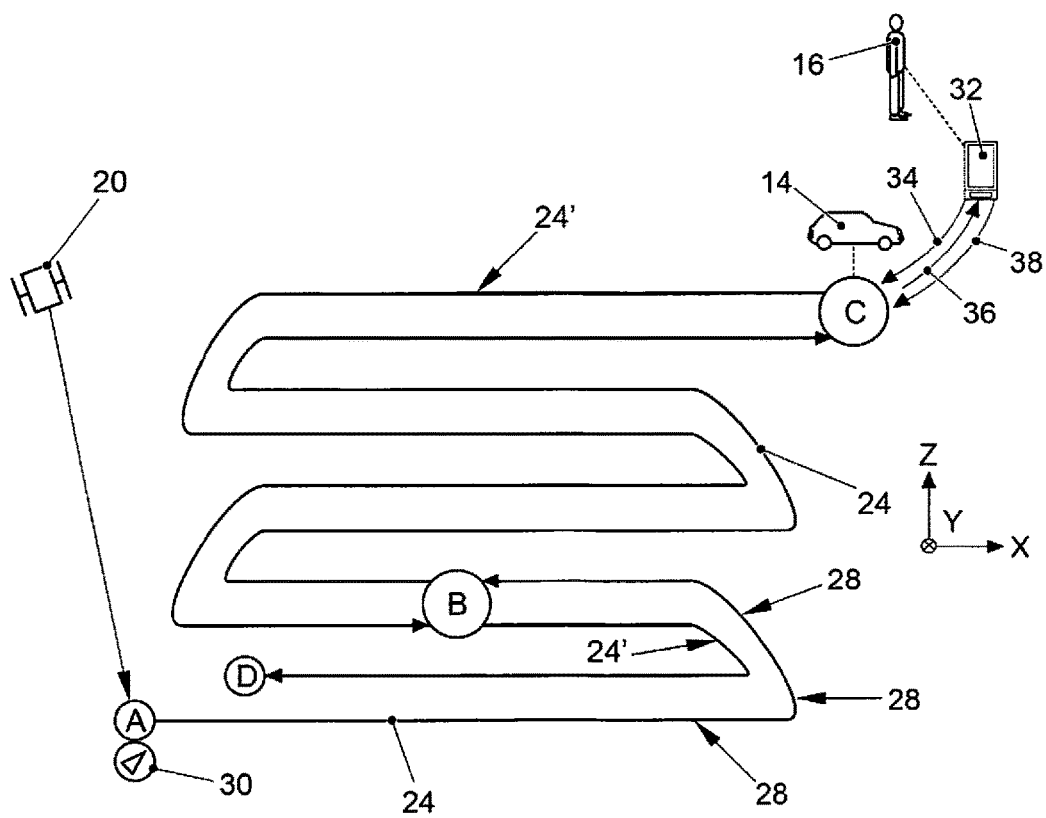
FIG. 1B shows a schematic illustration of the disclosed method for the user-defined provision of a vehicle in a second disclosed embodiment.

FIG. 1 shows a schematic illustration of the disclosed method for the user-defined provision of a vehicle in at least one disclosed embodiment. FIG. 1a describes the method on a physical plane and FIG. 1b describes in an analogous state thereto the method in the sense of information flows and control processes. The reference symbols used correspond here to the same features. A multi-story car park 10 with five parking levels 12 is shown. A motor vehicle 14 with a user 16 drives to an entry region 18 of the multi-story car park 10. The entry region 18 defines a starting point A which marks an entry into a parking region. The starting point A is assigned to a trajectory 24 of the motor vehicle on a path through the parking region. The starting point A is determined by means of a GPS system 20 which communicates with a navigation system of the motor vehicle 14. An orientation of the motor vehicle 14 in a horizontal plane 30 is determined at the starting point A by means of a compass. The user 16 drives the motor vehicle 14 as far as a first parking level 22 and exits the vehicle there at an exit point B. Communication with the GPS system 20 is not possible in the multi-story car park 10. The trajectory 24 of the motor vehicle 14 is produced as far as the exit point B and stored by continuously measuring a steering wheel position, a rotational speed of the wheels and a vertical inclination as well as an orientation in the horizontal plane 30 of the motor vehicle 14. The trajectory 24 can be represented by the position data plotted against the time by means of connected lines 28 which are of different lengths and run in different directions. A centimeter of a line can correspond, for example, to a real distance of two meters between two positions. The user 16 leaves the multi-story car park 10 via a staircase 26. The motor vehicle 14 now continues driving autonomously in the multi-story car park 10 and looks for an available parking position. It drives to a fourth parking level 29 and identifies a parking position C. The motor vehicle 14 drives to the parking position C and waits in a state of rest there. After a relatively long waiting time, the user 16 transmits, via a Smartphone 32, a request 34 for further use to the motor vehicle 14. As a result, the motor vehicle 14 is activated at the parking position C. The motor vehicle 14 transmits the trajectory 24 which has been travelled along as a conditioned data set 36 to the Smartphone 32. The conditioned data set 36 contains the position data, the starting point A and the exit point B as well as the orientation of the motor vehicle 14 in a horizontal plane 30 at the starting point A. The user 16 causes the trajectory 24 to be displayed, with a representation of the multi-story car park 10 superimposed therein, on the Smartphone 32. the starting point A, the position of which has been determined absolutely by means of the GPS system 20, is used, in conjunction with the orientation of the motor vehicle 14 in the horizontal plane 30 at the starting point A, to orient the trajectory 24 relative to the representation of the multi-story car park 10. The user 16 activates a transmission 38 of a transfer location D, defined by the user 16, to the motor vehicle 14 which is located at the parking position C. The transfer location D is a selected point on the trajectory 24. The motor vehicle 14 then drives autonomously to the transfer location D by travelling along the trajectory in the reverse sequence 24'. In other words, the motor vehicle 14 travels to different positions on the trajectory 24 in the reverse sequence compared to the forward journey. At the transfer location D, the user 16 takes possession of the motor vehicle 14 again for further use. In a way which is analogous to this exemplary embodiment, the method can be transferred to any desired parking regions. If the parking region is, purely by way of example, a public road area, an electronic map material of the road area is used instead of a representation of the multi-story car park.

Figure 2A:
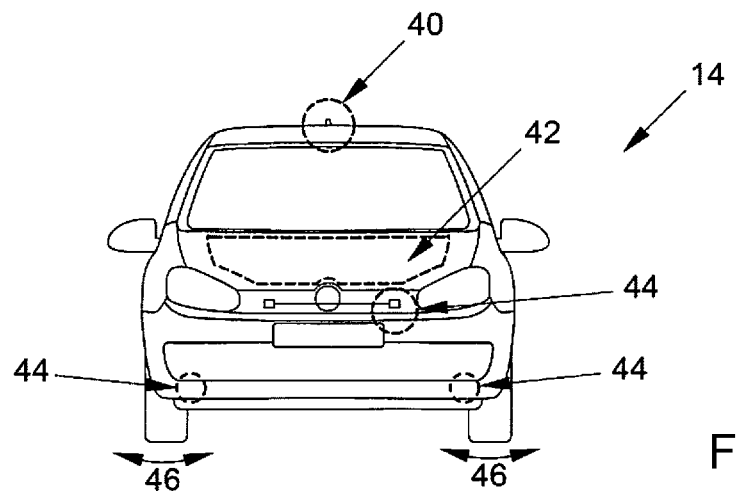
FIG. 2A shows a front view of the disclosed motor vehicle having the disclosed system for carrying out the disclosed method for the user-defined provision of a vehicle in at least one disclosed embodiment.
Figure 2B:
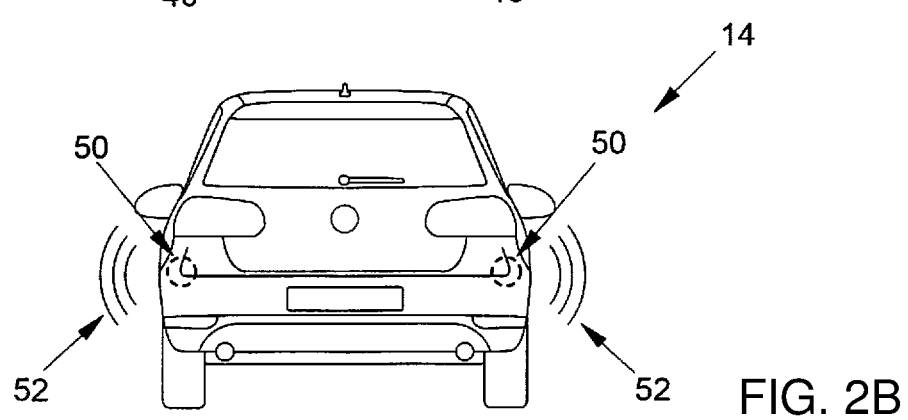
FIG. 2B shows a rear view of the disclosed motor vehicle having the disclosed system for carrying out the disclosed method for the user-defined provision of a vehicle in at least one disclosed embodiment.
Figure 2C:
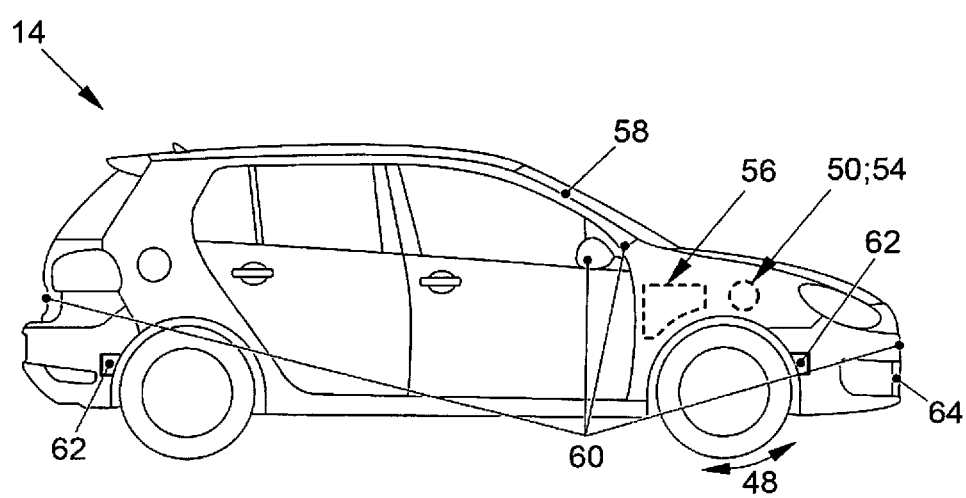
FIG. 2C shows a side view of the disclosed motor vehicle having the disclosed system for carrying out the disclosed method for the user-defined provision of a vehicle in at least one disclosed embodiment.

FIG. 2 shows the disclosed motor vehicle with the disclosed system for carrying out a disclosed method for the user-defined provision of a vehicle. The same reference symbols as in FIG. 1 are used where the same features are being referred to. In these cases, what is being described in FIG. 1 also applies to the same features in FIG. 2. The upper part of FIG. 2 shows a front view, the middle part shows a rear view and the lower part shows a side view of the motor vehicle 14. The motor vehicle 14 has in this exemplary embodiment an antenna 40 for communicating with vehicle-external apparatuses, for example, for communicating with a mobile apparatus of a driver or else for communicating with a GPS system for determining positions. Further communication means are provided as input and output elements 42 which are located in the region of a dashboard. The motor vehicle 14 has a multiplicity of actuators 44 for automatically activating actuator elements of the vehicle. These may, purely by way of example, influence a position 46 of the wheels or a rotational speed 48 of the wheels. In addition, the motor vehicle 14 has a sensor system for acquiring surroundings information 50 and vehicle information 50. The sensor system 50 can contain, purely by way of example, distance sensors for sensing objects in the surroundings. It is also possible to integrate inclination sensors 54 in the motor vehicle 14. The motor vehicle 14 also has an open-loop and closed-loop control system 56 for storing and processing communication information, vehicle information and surroundings information and for generating actuation signals for the actuators 44. In the lower part of FIG. 2, a number of sensors for acquiring surroundings information 50 and vehicle information 50 are specified in more detail by way of example. For example, a front-mounted camera 58 can be provided for capturing a far field of the motor vehicle 14. The front-mounted camera 58 can detect, for example, optical route markers which can be used to produce the trajectory 24. In addition, a surround camera system 60 is provided which can capture, for example, a near field of the motor vehicle 14 in all compass directions. In addition, ultrasonic sensors 62 and a radar system 64 for detecting the surroundings of a motor vehicle 14 can be provided.

LIST OF REFERENCE SYMBOLS

10 Multi-story car park
12 Parking levels
14 Motor vehicle
16 User
18 Entry region
20 GPS system
22 First parking level
24 Trajectory
24' Trajectory in reverse sequence
26 Staircase
28 Connected lines of different lengths and running in different directions
30 Orientation in a horizontal plane
32 Smartphone
34 Request
36 Data set
38 Transmission
40 Antenna
42 Input and output elements
44 Actuators
46 Position of wheels
48 Rotational speed of wheels
50 Sensor system for acquiring surroundings information and vehicle information
52 Distance sensors for sensing objects in the surroundings
54 Inclination sensors
56 Open-loop and closed-loop control system
58 Front-mounted camera
60 Surround camera system
62 Ultrasonic sensors
64 Radar system
A Starting point
B Exit point
C Parking position
D Transfer location

The invention claimed is:

1. A method for user-defined provision of a vehicle, the method comprising:
    identifying a parking position in a parking region; and
    automatically driving the vehicle, by the vehicle or with guidance by a user, at the request of the user, to a transfer location in the parking region for further use;
    storing a trajectory by continuously measuring the trajectory as it is travelled along to the parking position within the parking region;
    transmitting the trajectory to a mobile communication device,
    defining the transfer location at any desired point on the trajectory on the mobile communication device, and
    transmitting the transfer location to the vehicle,
    wherein the vehicle subsequently drives autonomously to the transfer location.

2. The method of claim 1, further comprising measuring and storing the trajectory by measuring and storing a horizontal and vertical direction of travel, a velocity and a time using a data storage device and processing device of the vehicle.

3. The method of claim 1, further comprising storing a user exit point position on the trajectory.

4. The method of claim 1, further comprising:
    receiving a request, from a user's mobile communication device, for further use to the vehicle; and in response to receipt of the request, activating the vehicle.

5. The method of claim 1, further comprising illustrating the trajectory on a user's mobile communication device with surroundings information superimposed thereon.

6. The method of claim 1, further comprising transmitting at least the trajectory to a further user, wherein the further user defines the transfer location.

7. A system for a vehicle, the system comprising:
means for communicating with vehicle-external apparatuses;
actuators for automatically activating actuator elements of the vehicle;
a sensor system for acquiring surroundings information and vehicle information; and
an open-loop and closed-loop control system for storing and processing communication information, vehicle information and surroundings information and for generating actuation signals for the actuators,
wherein the system is configured to carry out a method comprising:
identifying a parking position in a parking region; and
automatically driving the vehicle, by the vehicle or with guidance by a user, at the request of the user, to a transfer location in the parking region for further use;
storing and measuring a trajectory as it is travelled along to the parking position within the parking region;
transmitting the trajectory to a mobile communication device,
defining the transfer location at any desired point on the trajectory on the mobile communication device, and
transmitting the transfer location to the vehicle,
wherein the vehicle subsequently drives autonomously to the transfer location.

8. A motor vehicle comprising: a system according to claim 7.

9. The method of claim 1, wherein the trajectory includes linked position and time data, and the position data.

10. The method of claim 9, wherein a path is reconstructed from position data including angular position of wheels of the vehicle with respect to time.

11. The method of claim 1, wherein the trajectory data comprises position data plotted against time.

12. The system of claim 7, wherein the trajectory includes linked position and time data, and the position data describe a path.

13. The system of claim 12, wherein a path is reconstructed from position data including angular position of wheels of the vehicle with respect to time.

14. The system of claim 7, wherein the trajectory data comprises position data plotted against time.

15. The method of claim 1, wherein identifying the parking position further comprises searching for an available parking position while the trajectory data is being measured and stored.

* * * * *